United States Patent [19]
Silver et al.

[11] Patent Number: 5,874,733
[45] Date of Patent: Feb. 23, 1999

[54] CONVERGENT BEAM SCANNER LINEARIZING METHOD AND APPARATUS

[75] Inventors: Alan G. Silver, Monroe; Henry Heinemann, Monsey, both of N.Y.

[73] Assignee: Raytheon Company, Lexington, Mass.

[21] Appl. No.: 951,748

[22] Filed: Oct. 16, 1997

[51] Int. Cl.$^6$ .................................................. G01D 5/34
[52] U.S. Cl. ................................. 250/231.18; 250/235
[58] Field of Search ...................... 250/231.18, 231.13, 250/234, 235, 236, 206.1, 206.2; 356/375

[56] References Cited

U.S. PATENT DOCUMENTS 4,841,297  6/1989  Bourgeaux et al. ............... 250/231.15

*Primary Examiner*—Que Le
*Attorney, Agent, or Firm*—William C. Schubert; Glenn H. Lenzen, Jr.

[57] ABSTRACT

A method of position encoding in convergent beam scanned imaging systems (10) is provided that reduces distortion. Distortion of a scanned image is introduced in convergent beam systems through the application of mirror "pullback" at the limits of the scanning sector, which is required to retain focus over the field of view or scanning sector. The rotational position of a scanner mirror (14) is not proportional to the spatial scanned angle or object space angle ($\delta$) due to this pullback, and thus introduces distortion. Various components of the pullback motion are utilized to provide the compensation required to overcome this distortion. A process is provided that determines the position of a mirror position detector such that the pullback translation motion of the scanner mirror (14) is used to compensate for the nonlinear rotational motion of the scanner mirror (14). This is accomplished by locating the mirror position detector (16) at a predetermined radial distance and angular position with respect to the scanner mirror (14) point of rotation and sensing the rotation of the scanner mirror (14) and pullback. By appropriately selecting the angular position of the mirror position detector (16) with respect to the scanner mirror (14) center of rotation and the direction of pullback, the output of the mirror position detector becomes a substantially linearized representation of the object space angle ($\delta$). Significant reductions in distortion can thus be obtained via optimizing the angular position of the mirror position detector (16) through an iterative mathematical approach performed by a computer.

23 Claims, 15 Drawing Sheets

$f_{pdfov} = 45.193021$ mm   $y_{dfov} = .8$ in   $fl_{dfov} = 60.787788$ mm   $r_{encode} = (1.022)$ in $f_{p600} = 1.063$ in   $y_{600} = .65$ in   $fl_{600} = 2.75$ in   $r_{encode} = 1.022$ in $\eta = 1$ deg   mils $= \dfrac{\text{in}}{1000}$ $f_{petzval} = f_{pdfov}$    $fl = fl_{dfov}$ $r_1 = .5$ in   $r_2 = .299$ in   $r_3 = .094$ in   Define geometry of crank arms and position of detector.
Motor axis assumed as 0.0

System focal length $fl = 2.39322$ in $x_1$ $r_2 - r_1 - r_3 \cos(45 \deg)$   $x_1 = 0.631446$ in $\text{mag}(M) \sqrt{(M_0)^2 - (M_1)^2}$   Initial guess for mirror position $y_1 = (r_2 - (r_1 - r_3) \sin(45 \deg)$   $y_0 = y_1$   $x_0 = x_1$   $y_d = y_0 - y_{dfov}$   $y_d = 1.431446$ in encoder $\begin{pmatrix} x_0 = r_{encode} \cos(n) \\ y_0 = r_{encode} \sin(n) \end{pmatrix}$   $x_d = x_0$   $x_d = 0.631446$ in $x_2(\gamma) = \cos(\gamma)$   $y_2(\gamma)$   $r_2 \sin(\gamma)$   Computed position of crank given $x_1 = y_1$   Confine mirror pivot to ride along 45 degree slide $(x_2(\gamma) \ x_1)^2 - (y_2(\gamma) - y_1)^2 = r_1^2$ $\text{pivot}(\gamma) = \text{Find}(x_1 - y_1)$   Compute position of mirror pivot

FIG. 4A $$\text{pivot2}(0) = \begin{pmatrix} x_{2(0)} \\ y_{2(0)} \end{pmatrix} \quad \text{array} = \begin{pmatrix} x_d \\ y_d \end{pmatrix} \quad \text{Vector for crank pivot and array position}$$

$$\text{normal}(0) = \frac{\text{pivot1}(0) - \text{pivot2}(0)}{r_1} \quad \text{Compute normal vector to mirror}$$

$$\text{mirror}(0) = \text{pivot}(0) + \text{normal}(0) - r_3$$

********* Compute pullback ******************

$$a_{mirr}(0) = \tan(\text{acos}(\text{normal}(0)_0) + 90 \text{ deg}) \quad \text{Compute slope of mirror surface}$$

$$b(0) = \text{mirror}(0)_1 - a_{mirr}(0)\, \text{mirror}(0)_0$$

$$x_r(0) = \frac{b(0)}{1 - a_{mirr}(0)}$$

$$\text{pullback}(0) \sqrt{[2(x_r(0)\ x_0)]^2} \quad \text{pullbackr}(0) = [2(x_0 - \text{mirror}(0)_0)]$$

FIG. 4B

\*\*\*\*\*\*\*\*\*\*\*\*\*\*\*\*\*\*\*\*\*\*\*\* Compute angle to encoder from mirror \*\*\*\*\*\*\*\*\*\*\*\*\*\*\*\*\*\*\*\*\*\*\*\*\*\*\*\*

$$\text{encode angle}(\theta) = \text{acos}\left[\frac{(\text{encoder}-\text{mirror}(\theta)) \cdot \text{normal}(\theta)}{\text{mag}(\text{mirror}(\theta) - \text{encoder})}\right]$$

$\text{detector}(\theta) = \text{array} - \text{mirror}(\theta)$ Comput vector from mirror to array $$\phi(\theta) = \text{acos}\left(\frac{\text{normal}(\theta) \cdot \text{detector}(\theta)}{\text{mag}(\text{detector}(\theta))}\right) \quad \begin{array}{l}\text{Compute angle between mirror normal and detector vector by}\\ \text{normalized dot product. This is angle of reflection.}\end{array}$$

\*\*\*\*\*\*\*\*\* Compute reflected position of array \*\*\*\*\*\*\*\*\*\*\*\*

$\alpha(\theta) = (90) \text{ deg} - \phi(\theta)$  Angle between mirror surface and detector as measured from mirror pivot $\lambda(\theta) = -2\alpha(\theta)$ $$\text{rotate}(a,b) = \begin{pmatrix} a_0 b_{0,0} + a_1 b_{0,1} \\ a_0 b_{1,0} + a_1 b_{1,1} \end{pmatrix} \quad \text{Create rotation matrix}$$

$$\text{reflected}(\theta) = \text{rotate}\left[\text{array} - \text{mirror}(\theta), \begin{pmatrix} \cos(\lambda(0)) & \sin(\lambda(0)) \\ \sin(\lambda(0)) & \cos(\lambda(0)) \end{pmatrix}\right] + \text{mirror}(\theta) \quad \begin{array}{l}\text{Rotate the detector array by twice}\\ \text{the mirror angle}\end{array}$$

FIG. 4C

*****Compute image plane and scan angle for differen******* last_one = 38 i 0_last_one x lens = f petzval + x 0 - (yd - y0)    y(0) = reflected(0)

$\beta_i = (45 - \frac{\text{last one}}{2} + i) \deg \quad x(0) = \text{reflected}(0)_0$ $R_i = \sqrt{|x(i) - x\text{lens}|^2 (y(i) y 0)^2}$

*******************Compute object space angle******************

$\delta_i = \text{atan}(\frac{y(i) y 0}{fl})$ i = 0..last one 1

$\lim i = \frac{i - i+_1}{\text{mir } i - \text{mir } i+_1}$   $\text{lin} i = \frac{i - i}{i - i+_1}$ linencode i   $\frac{i - i+_1}{}$   nonlin last one = nonlin   nonlin last one = nonlin $\underline{\text{nonlin } i} = \underline{\text{linecode}}$

FIG. 4D

| $\bar{\delta}_i$ / deg | $\beta_i$ / deg | pullback $\beta_i$ / mils | $mir_i$ / deg | $error_i$ / mils | linencode_i / linencode | encode angle $\beta_i$ / deg |
|---|---|---|---|---|---|---|
| 8.196471 | 26 | 24.023718 | -33.773399 | 0.720974 | 0.957738 | 122.35763 |
| 7.748136 | 27 | 21.598017 | -34.350985 | 0.622085 | 0.963412 | 123.014959 |
| 7.300133 | 28 | 19.295779 | -34.930753 | 0.531882 | 0.968681 | 123.667936 |
| 6.852757 | 29 | 17.118271 | -35.512575 | 0.450184 | 0.973548 | 124.31645 |
| 6.406303 | 30 | 15.066689 | -36.096323 | 0.376762 | 0.978012 | 124.960393 |
| 5.961059 | 31 | 13.142159 | -36.681871 | 0.311342 | 0.982077 | 125.599659 |
| 5.51731 | 32 | 11.345737 | -37.269093 | 0.253603 | 0.98575 | 126.234142 |
| 5.075333 | 33 | 9.678409 | -37.857865 | 0.203189 | 0.989035 | 126.863737 |
| 4.635399 | 34 | 8.141089 | -38.448065 | 0.159707 | 0.991942 | 127.488339 |
| 4.197772 | 35 | 6.734618 | -39.039569 | 0.122731 | 0.994481 | 128.107845 |
| 3.762707 | 36 | 5.459766 | -39.632257 | 0.091807 | 0.996661 | 128.722152 |
| 3.330452 | 37 | 4.317232 | -40.226007 | 0.066454 | 0.998496 | 129.331156 |
| 2.901244 | 38 | 3.30764 | -40.820701 | 0.046168 | 1 | 129.934756 |
| 2.475311 | 39 | 2.431542 | -41.416218 | 0.030424 | 1.001187 | 130.532849 |
| 2.052873 | 40 | 1.689416 | -42.01244 | 0.01868 | 1.002075 | 131.125332 |
| 1.634137 | 41 | 1.08167 | -42.609249 | 0.010377 | 1.00268 | 131.712102 |
| 1.2193 | 42 | 0.608633 | -43.206527 | 0.004944 | 1.003021 | 132.293058 |
| 0.80855 | 43 | 0.270565 | -43.804156 | 0.001798 | 1.003118 | 132.868095 |
| 0.402062 | 44 | 0.067651 | -44.40202 | 0.000349 | 1.002991 | 133.43711 |
| $3.986957 \cdot 10^{-13}$ | 45 | $3.532708 \cdot 10^{-13}$ | 45 | 0 | 1.002662 | 134 |
| 0.397481 | 46 | 0.067651 | -45.59798 | 0.000148 | 1.002153 | 134.55666 |
| 0.79024 | 47 | 0.270565 | -46.195844 | 0.00019 | 1.001488 | 135.106985 |
| 1.178145 | 48 | 0.608633 | -46.793473 | 0.000481 | 1.000691 | 135.650871 |
| 1.561076 | 49 | 1.08167 | -47.390751 | 0.002469 | 0.999786 | 136.18821 |
| 1.938923 | 50 | 1.689416 | -47.98756 | 0.006376 | 0.998798 | 136.718896 |
| 2.311589 | 51 | 2.431542 | 48.583782 | 0.012801 | 0.997755 | 137.242821 |
| 2.678985 | 52 | 3.30764 | -49.179299 | 0.022339 | 0.996682 | 137.759878 |
| 3.041032 | 53 | 4.317232 | -49.773993 | 0.035577 | 0.995607 | 138.269956 |
| 3.397664 | 54 | 5.459766 | -50.367743 | 0.053096 | 0.994558 | 138.772948 |
| 3.748823 | 55 | 6.734618 | -51.551935 | 0.10327 | 0.992656 | 139.757224 |
| 4.094458 | 56 | 8.141089 | -52.142135 | 0.137049 | 0.991862 | 140.238285 |
| 4.43453 | 57 | 9.678409 | 52.730907 | 0.177359 | 0.991215 | 140.711812 |
| 4.769009 | 58 | 11.345737 | -53.318129 | 0.224744 | 0.990745 | 141.17769 |
| 5.097869 | 59 | 13.142159 | -53.903677 | 0.279738 | 0.990487 | 141.635805 |
| 5.421097 | 60 | 15.066689 | -54.487425 | 0.342873 | 0.990475 | 142.086042 |
| 5.738684 | 61 | 17.118271 | -55.069247 | 0.414671 | 0.990745 | 142.528284 |
| 6.050628 | 62 | 19.295779 | -55.649015 | 0.495656 | 0.991333 | 142.962417 |
| 6.356934 | 63 | 21.598017 | | | | |

FIG.4E $\text{error}(f) = \text{linerp}(\delta, \text{R-f petzval}, f)$  $\text{crank}(f) = \text{linterp}(\delta, \beta, f)$ $\text{error}(4.5 \text{ deg}) = -0.148266 \text{ mils}$  $\text{mirr}(f) = \text{linterp}(\delta, \text{mir}, f)$ $\text{nonlinear}(f) = \text{linerp}(\delta, \text{nonlin}, f)$  $\text{enc}(f) = \text{linterp}(\delta, \text{enc angle}, f)$ $\text{pull}(f) = \text{linterp}(\delta, \text{pullt}, f)$ $r_{\text{encode}} = 1.022 \text{ in}$ y dtov = 0.8 in $r_1 = 0.5 \text{ in}$ $r_2 = 0.299 \text{ in}$  Total_encoder_pulses = $(\text{enc}(4.5 \text{ deg}) - \text{enc}(-4.5 \text{ deg})) \cdot \dfrac{2048}{360 \text{ deg}} \dfrac{r_{\text{encode}}}{.92 \text{ in}}$ $r_3 = 0.094 \text{ in}$ Total_encoder_pulses = 79.949191 j = -4.5 deg, -4 deg .. 4.5 deg

FIG.4F

| j / deg | crank(i) / deg | error(i) / mils | mirr(i) / deg | pull(i) / mils | nonlinear(i) | enc(i) / deg |
|---|---|---|---|---|---|---|
| 4.5 | 34.309393 | 0.148266 | 38.631072 | 7.705937 | 0.992728 | 127.680009 |
| 4 | 35.45458 | 0.108673 | 39.308993 | 6.155096 | 0.995472 | 128.387096 |
| 3.5 | 36.607759 | 0.076398 | 39.993114 | 4.765381 | 0.997776 | 129.09228 |
| 3 | 37.769911 | 0.050835 | 40.683868 | 3.539936 | 0.999654 | 129.795874 |
| 2.5 | 38.942036 | 0.031337 | 41.3817 | 2.482323 | 1.001119 | 130.498181 |
| 2 | 40.126268 | 0.017632 | 42.087798 | 1.612677 | 1.002151 | 131.199422 |
| 1.5 | 41.323349 | 0.00862 | 42.802378 | 0.928714 | 1.00279 | 131.899953 |
| 1 | 42.533901 | 0.003264 | 43.525602 | 0.428138 | 1.003072 | 132.600071 |
| 0.5 | 43.759062 | 0.000698 | 44.257972 | 0.11654 | 1.003021 | 133.300013 |
| $1.590277 \cdot 10^{-15}$ | 45 | 0 | 45 | $3.536787 \cdot 10^{-13}$ | 1.002662 | 134 |
| 0.5 | 46.261022 | 0.000159 | 45.754036 | 0.120616 | 1.00198 | 134.700307 |
| 1 | 47.540751 | 0.000173 | 46.519013 | 0.453376 | 1.001057 | 135.401092 |
| 1.5 | 48.840504 | 0.002152 | 47.295488 | 1.0066222 | 0.99993 | 136.102506 |
| 2 | 50.163891 | 0.007429 | 48.085276 | 1.811044 | 0.998627 | 136.804762 |
| 2.5 | 51.512829 | 0.017693 | 48.88918 | 2.88083 | 0.997204 | 137.507982 |
| 3 | 52.886666 | 0.034076 | 49.706594 | 4.202811 | 0.995729 | 138.212147 |
| 3.5 | 54.291423 | 0.059617 | 50.540466 | 5.831287 | 0.994269 | 138.917433 |
| 4 | 55.726712 | 0.095673 | 51.390284 | 7.756718 | 0.9920905 | 139.623727 |
| 4.5 | 57.195737 | 0.144939 | 52.257379 | 10.004767 | 0.991736 | 140.330972 |

FIG.4G

CONVERGENT BEAM SCANNER LINEARIZING METHOD AND APPARATUS

BACKGROUND OF THE INVENTION

This invention relates to convergent beam scanned imaging systems and in particular to a method of position encoding in convergent beam scanned imaging systems that reduces inherent distortion.

Convergent Versus Parallel Beam Scanned Imaging Systems

Convergent beam scanning lends itself to compact, lightweight imaging systems which are especially suited for thermal rifle sights, weapon sights, surveillance systems and even driving systems. Heretofore, parallel beam scanning was favored over convergent beam scanning in many applications because of the inherent distortion found in convergent beam scanning. However, convergent beam scanning offers several important advantages over parallel beam scanning mainly comprising a reduced optical element count, a smaller scan mirror, and smaller optics, all of which allow for trim in-line packaging with a corresponding reduction in weight. Parallel beam scanning, although not subject to the distortion inherent in convergent techniques, is bulkier and heavier and therefore does not lend itself to use in "in-line" packaging, which is desirable for rifle and weapon sights.

Therefore, it would be advantageous if the distortion inherent in convergent beam scanned imaging systems could be substantially decreased using commercially available, low cost components without the need for additional devices. This would enable the more desirable method of convergent beam scanning to be used in a variety of applications for which its advantages would be preferable to parallel beam scanning techniques.

Inherent Distortion in Convergent Beam Scanned Imaging Systems

Referring to FIGS. 1 and 5, continuous focus correction is required in the convergent beam scanned imaging systems as a scanner mirror 14 traverses the field of view or scene to be scanned. When the scanner mirror is at 45 degrees (position A in FIG. 5) with respect to a central ray 36 passing normally through the center of the imaging lens 12, the central ray 36 converges on the detector 20. However, when the scanner mirror is rotated plus or minus a fixed angle about its center of rotation without permitting the center of the scanner mirror to pullback (i.e. pull away from the lens), the scanned image will no longer converge on the detector. In such a case, the field of view comes to a focus behind the detector, thereby providing an out of focus image. It becomes clear that to maintain focus at the detector throughout the scanning sector, the position of the scanner mirror must be pulled backwards (i.e. so-called pullback) as it deviates from the 45-degree position as shown at position A to positions B or C as illustrated in FIG. 5.

The pullback of the center of rotation of the scanner mirror 14 is illustrated from point O, the 45-degree position, to point O', the pullback position. The exact location of the scanner mirror 14 in order to achieve focus throughout the scanning sector would follow that of a locus of tangents to an ellipse 68 comprising the center of the imager F1, and the center of the detector F2 as foci.

It can be seen that the angles for the two extreme positions are not equal and, thus, when scanning equal spatial angles, the mirror angles are unequal. Therefore, detecting the rotational position of a scanner mirror motor or the scanner mirror will not provide a linear correlation with the object space angle δ as shown in FIGS. 6 and 7, respectively, due to effects of pullback. If this position information is used to display the image, horizontal distortion will result.

Therefore, it would be advantageous if a method could be derived which accurately and linearly provides the object space angle δ as a function of rotational angle at minimal expense in terms of components, space, power and cost.

Known Methods for Solving Inherent Distortion

Some of the methods employed in the prior art sought to solve the distortion problem in convergent beam scanned imaging systems with non-linear analog cancellation techniques. Such techniques have in large part shown themselves to be difficult to implement and manufacture in quantity, subject to a lack in precision, inconsistent or non-repeatable, and sensitive to fluctuations in temperature. Each of these disadvantages indicates that such a method of cancellation would be highly undesirable in both military and commercial applications. Look-up tables have also been utilized in the prior art to compensate for inherent distortion. However, this method is also inadvisable for a number of reasons, including the consumption of additional space, power and expense in storing the look-up tables and a greater number of encoder positions are required than for equally spaced data, which translates into additional size, weight, heat dissipation and cost of the final product.

Therefore, it would be advantageous if the distortion inherent in convergent beam scanned imaging systems could be substantially eliminated using a method that would be practical to implement and manufacture in quantity, relatively precise, repeatable, and not subject to fluctuations over normal operating temperatures. It would also be advantageous if such a method would not add appreciable ace, power or cost to the final product.

SUMMARY OF THE INVENTION

In accordance with the present invention, a method of position encoding in convergent beam scanned imaging systems is provided that reduces distortion. Distortion of a scanned image is introduced in convergent beam scanned imaging systems through the application of continuous mirror "pullback" over the scanning sector, which is required to retain focus over the field of view or scanning sector. The rotational position of a scanner mirror is not proportional to the spatial scanned angle or object space angle due to this pullback, and thus introduces distortion. The present invention utilizes the pullback motion to provide the compensation required in order to overcome distortion.

Thus, a process is provided that determines the position of a mirror position detector such that the pullback translation motion of the scanner mirror is used to compensate for the nonlinear rotational motion of the scanner mirror. This is accomplished by locating the mirror position detector at a predetermined radial distance and angular position with respect to the scanner mirror point of rotation and utilizing the rotation of the scanner mirror and pullback. By appropriately selecting the angular position of the mirror position detector with respect to the scanner mirror center of rotation and the direction of pullback, the output of the mirror position detector becomes a substantially linearized representation of the object space angle. Significant reductions in distortion can thus be obtained via optimizing the angular position of the mirror position detector. The optimum position can be determined by means of an iterative mathematical methodology performed by a computer.

BRIEF DESCRIPTION OF THE DRAWING

FIGS. 4A–G illustrate an embodiment of the iterative computer process for determining the optimal placement of the mirror position detector resulting in optimal linearization of output from the mirror position detector with respect to object space angle performed using the MathCad® program.

DETAILED DESCRIPTION OF THE PREFERRED EMBODIMENT

Figure 1:
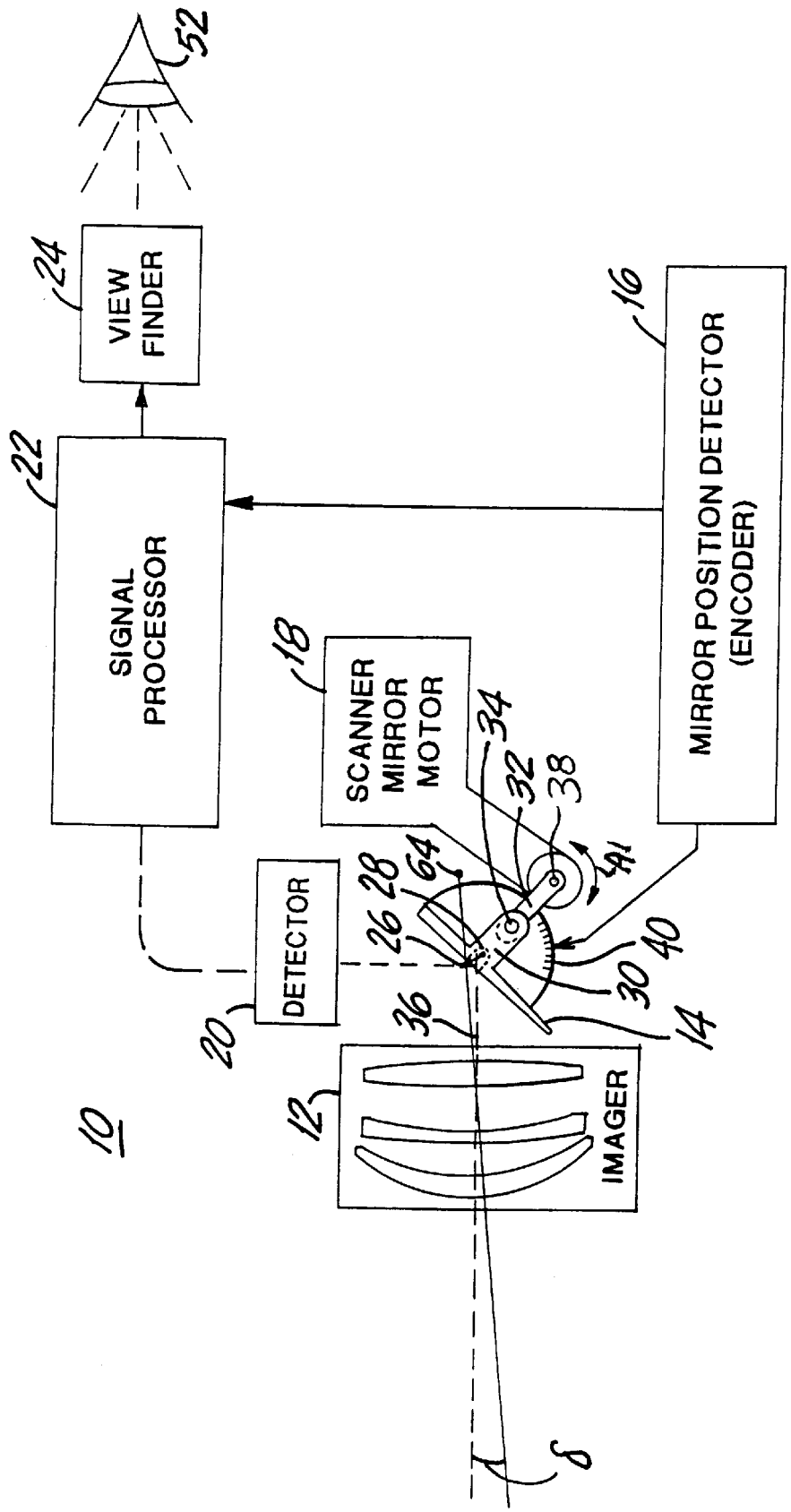
FIG. 1 is a block diagram illustrating a convergent beam scanned imaging system utilizing an optimal placement of a mirror position detector of the present invention in order to overcome inherent distortion.

The convergent beam scanned imaging system 10 shown in FIG. 1 comprises an imager or lens 12, a scanner mirror 14, a mirror position detector or encoder 16, a scanner mirror motor 18, a detector 20, a signal processor 22, and a viewfinder 24. Continuous focus correction is required as the scanner mirror 14 traverses to capture and image the scene to be scanned. As discussed above, when the scanner mirror 14 is at 45 degrees with respect to the central ray 36, the central ray 36 is imaged onto the detector 20. However, when the scanner mirror 14 is rotated plus or minus a fixed angle about its center of rotation without pullback of the center of rotation, the scanned image will no longer converge on the detector 20. In this case, the outer rays 66 come to a focus behind the detector 20, indicating an out of focus condition at the edges of the field of view or scanning sector. It becomes clear that to maintain focus at the detector 20 throughout the scanning sector the path length of the outer rays 66 must be increased. Such an increase is obtained by pulling the mirror backwards as it deviates from the 45-degree position A to pullback positions B or C as shown in FIG. 5.

Figure 5:
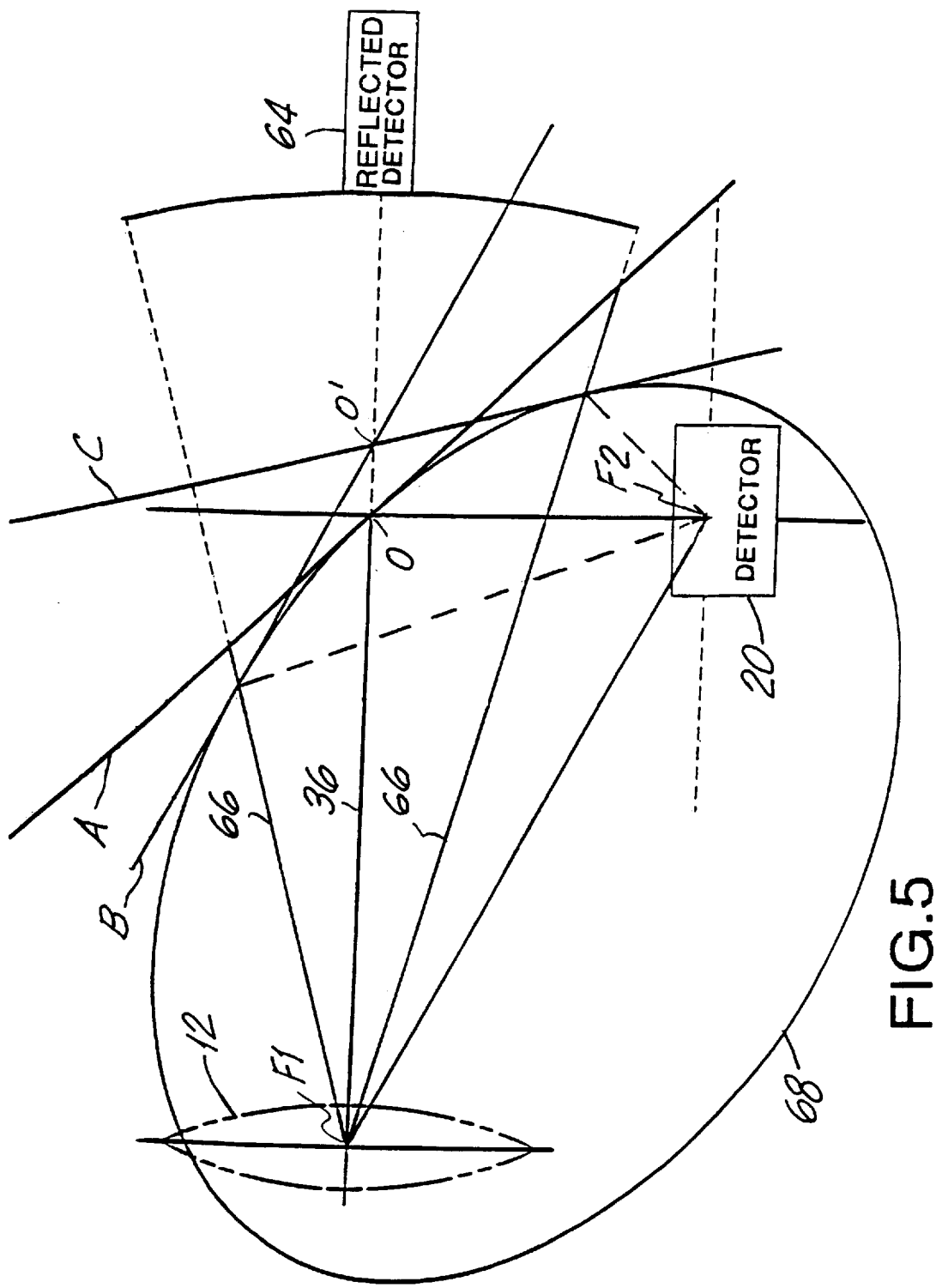
FIG. 5 is a block diagram illustrating optimal placement of a scanner mirror around an ellipse and the role played by pullback of the scanner mirror in the present invention.

The pullback of the center of rotation of the scanner mirror is illustrated in FIG. 5 from point O, the 45-degree position, to point O', the pullback position. The exact location of the scanner mirror 14 in order to achieve focus throughout the scanning sector would follow that of a locus of tangents to an ellipse 68 comprising the center of the imager F1, and the center of the detector F2 as foci. However, the resulting display using a scanner mirror position detector 20 that follows the ellipse 68, although always in focus, is nonlinear and results in a distorted image. In practice this pullback is approximated using a reciprocating torque motor with an intermediate linkage 30 and crank 32 such as is illustrated in FIG. 1.

Figure 3:
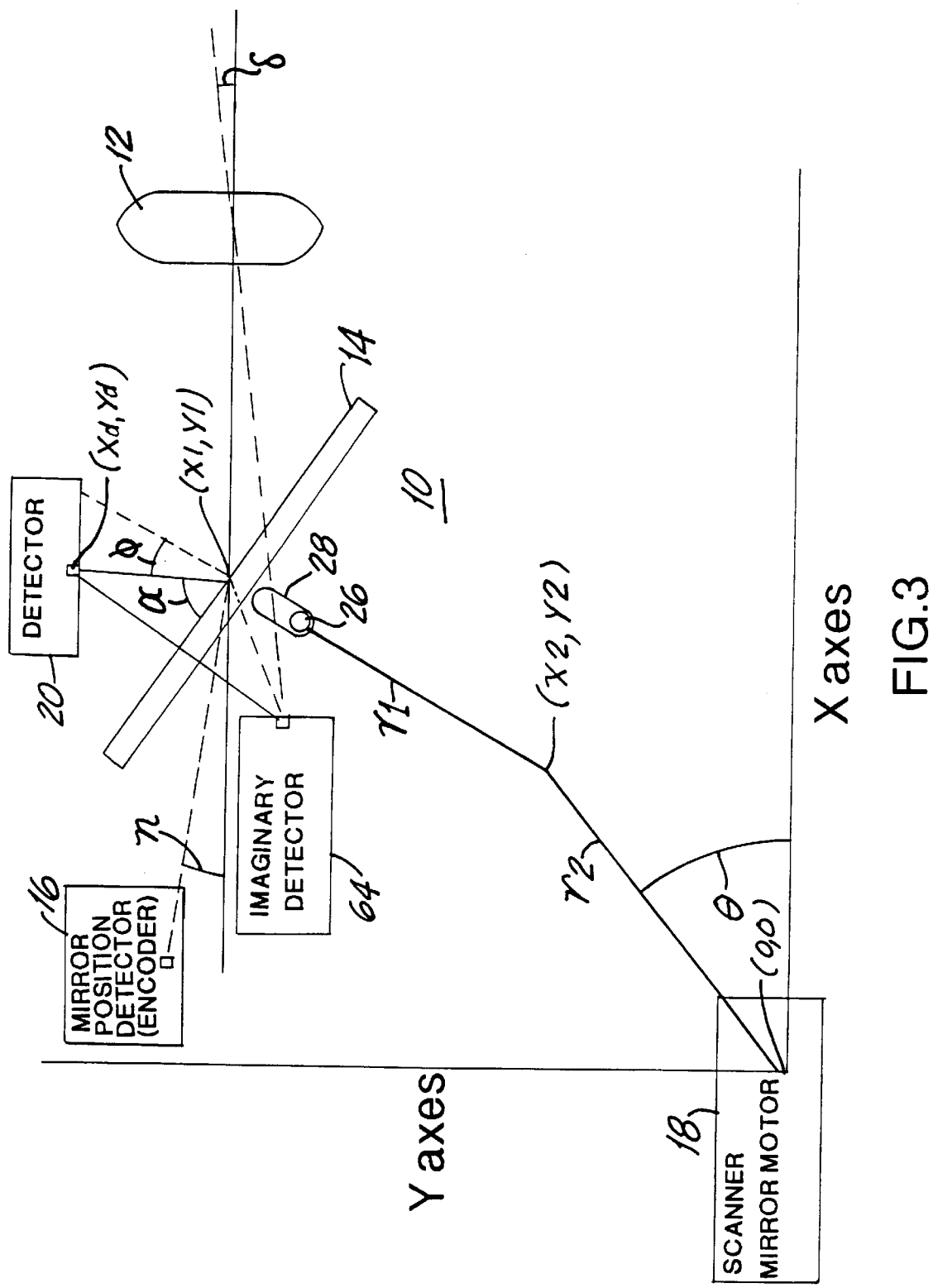
FIG. 3 is a graphical illustration of the convergent beam scanned imaging system illustrated in FIG. 1 which is used in an iterative computer process for determining the optimal placement of the mirror position detector.

As shown in FIG. 3 the reciprocating scanner mirror motor 18 is affixed to a crank r2 (32) and a intermediate linkage r1 (30), which is part of the scanner mirror 14. The scanner mirror 14 rotates about a mirror pin 26 while the mirror pin 26 slides within a slot 28. When r2 is in its extended position, the scanner mirror 14 is in the center of its scan (i.e. the 45-degree position). When rotated to either side, the scanner mirror 14 is pulled back from point O, the position the scanner mirror 14 occupies in the 45-degree position, to point O', the pullback position, substantially following the ellipse 68 as illustrated in FIG. 5. Thus, in correcting the inherent focusing problem in convergent beam scanned imaging system at the limits of the scan, a new problem of how to accurately determine the object space angle δ for proper storage and display of the scanned sector is introduced. The object space angle δ is obtained by extending a line from an reflected detector 64 (which represents the detector 20 as seen looking through the imager 12 and shown as a point on FIG. 1) located behind the scanner mirror 14 through the center of the imager 12. The angle made between the extended line and a central ray 36 passing through the nodal plane of the imager 12 is the object space angle δ. The object space angle δ essentially represents that azimuth (horizontal position) of the scanning sector appearing on the detector 20 given a specific position of the scanner mirror 14. If the rotational position of either the scanner mirror 14 or the scanner mirror motor 18 is used to determine object space angle δ, significant distortion will result in the image at the viewfinder.

Figure 6:
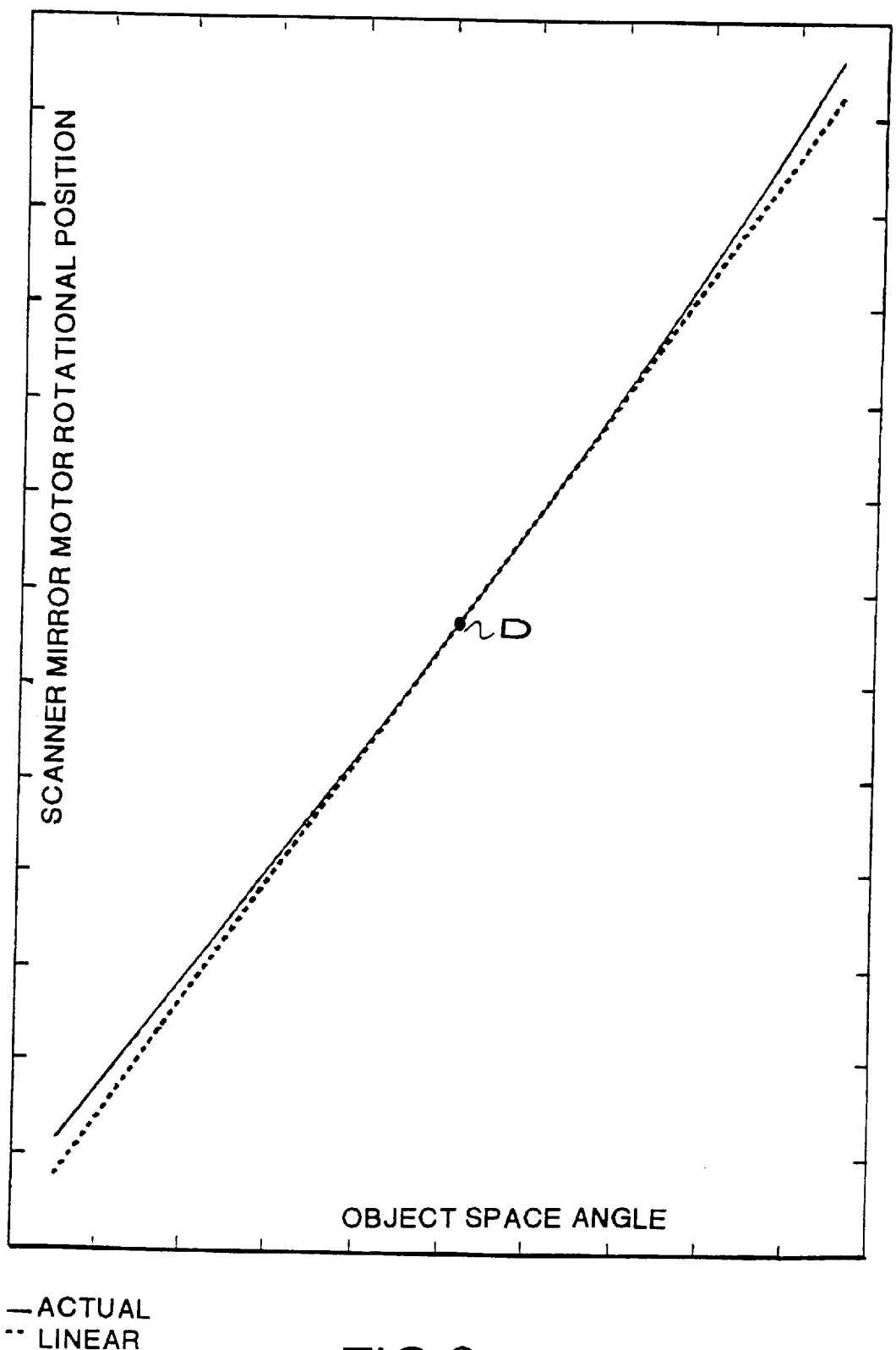
FIG. 6 illustrates non-linearity that results if the rotational position of the scanner motor is used to represent the object space angle.

FIG. 6 graphically illustrates the resulting distortion if the mirror position detector 16 were mounted directly on the scanner mirror motor. A solid line represents the rotational position of the scanner mirror motor with respect to the object space angle δ and a dotted line represents an ideal linear relationship between these two quantities. As can readily be seen by comparison between the dotted line and the solid line, a linear relationship exists only around the center of the scan at point D (the 45-degree position) since at this position pullback does not occur. Therefore, if the rotational position of the scanner mirror motor is directly used to represent the object space angle δ significant distortion will result.

Figure 7:
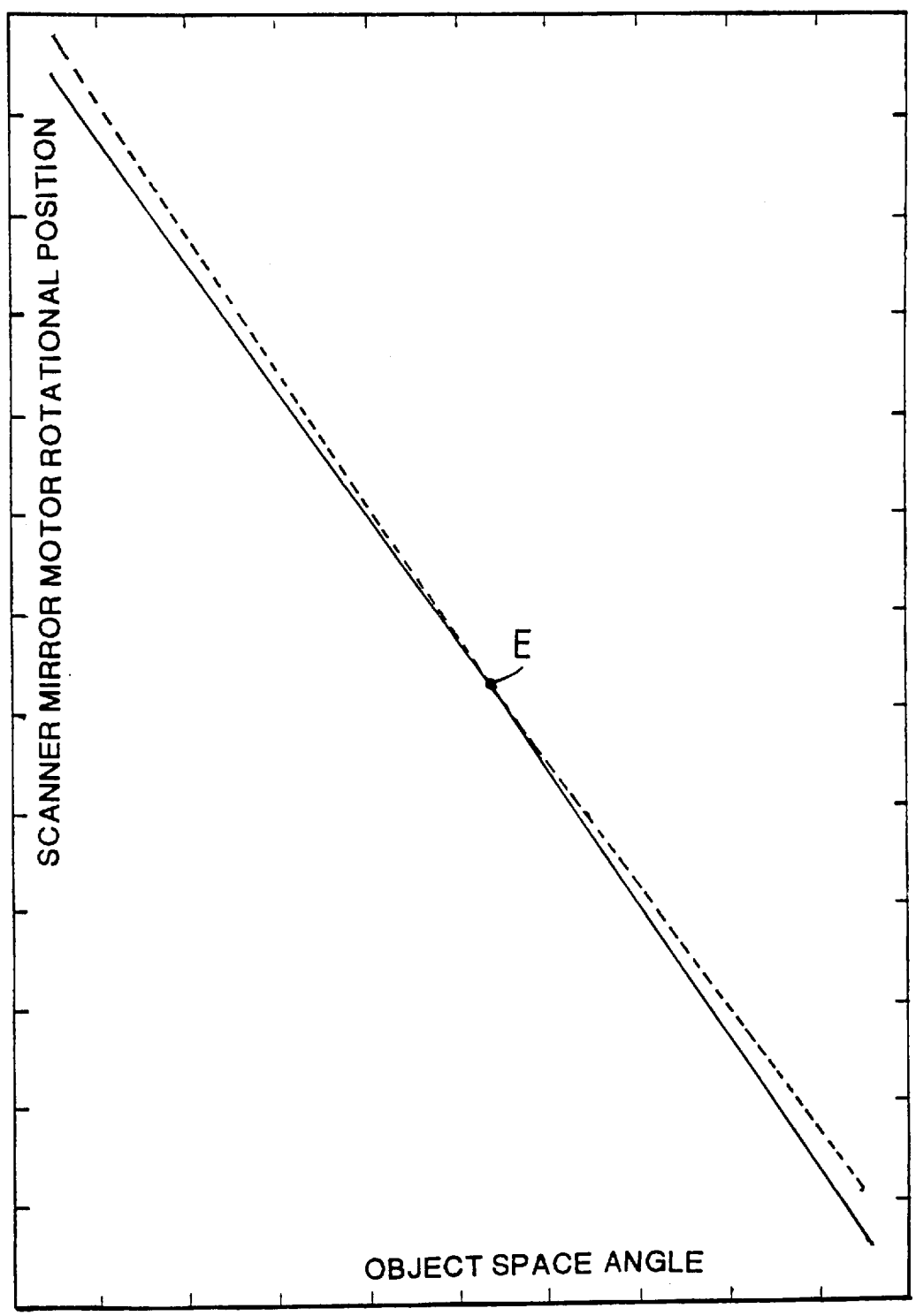
FIG. 7 illustrates non-linearity that results when the rotational position of the scanner mirror is used to represent the object space angle.

Likewise, FIG. 7 illustrates, with a solid line, a graph of the rotational position of the scanner mirror with respect to the object space angle δ, if the mirror position detector were mounted directly on the scanner mirror. A linear relationship between the rotational position of the scanner mirror and the object space angle δ is illustrated by a dotted line. As can readily be seen by comparison between the dotted line and the solid line, a linear relationship exists only around the center of the scan at point E (the 45-degree position) since at this position pullback does not occur. Therefore, if the rotational position of the scanner mirror is directly used to represent the object space angle δ significant distortion will also result.

Figure 2:
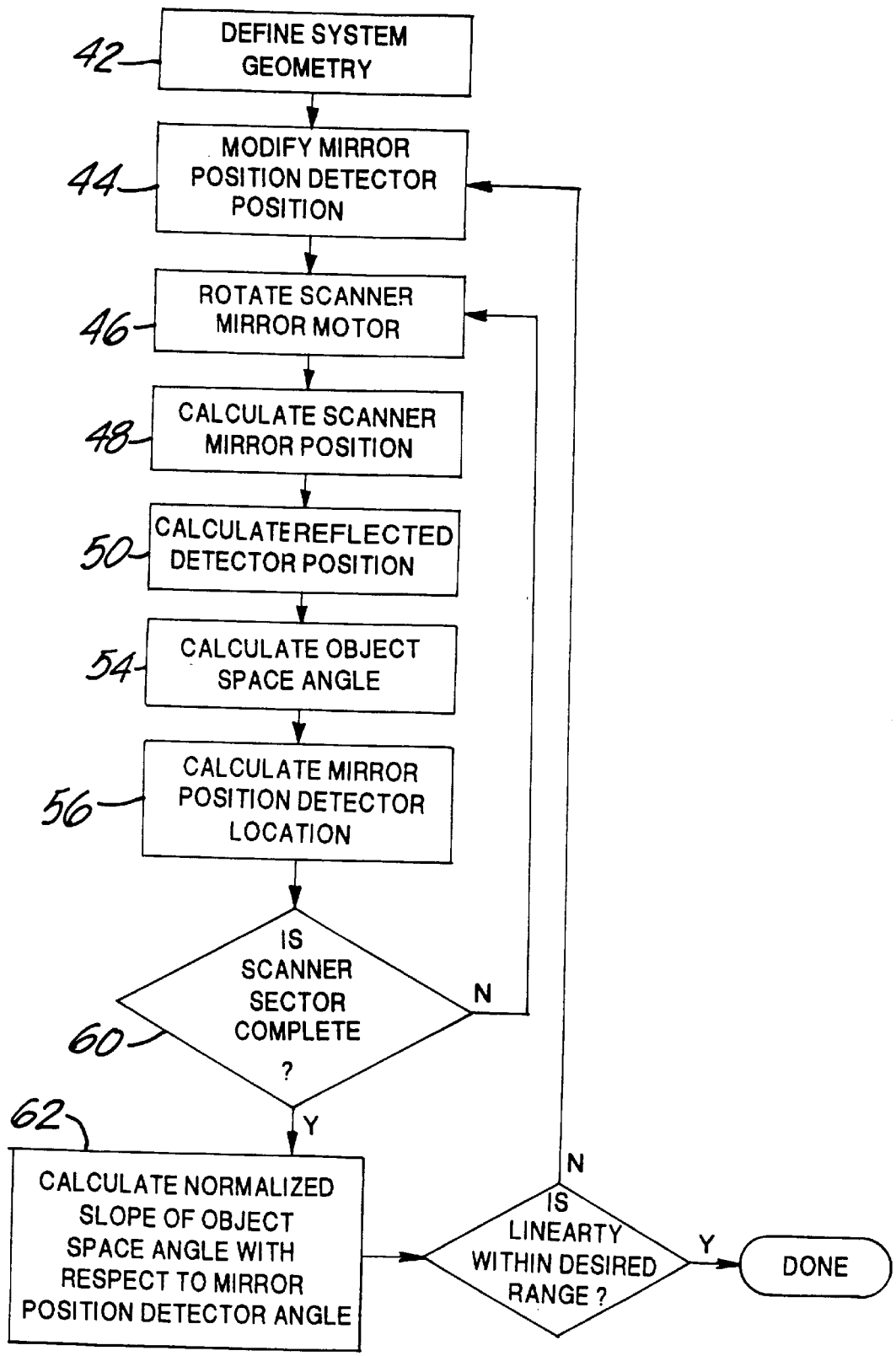
FIG. 2 is a flow chart illustrating a method for determining the optimal placement of the mirror position detector resulting in optimal linearization of output from the mirror position detector with respect to an object space angle.
Figure 8:
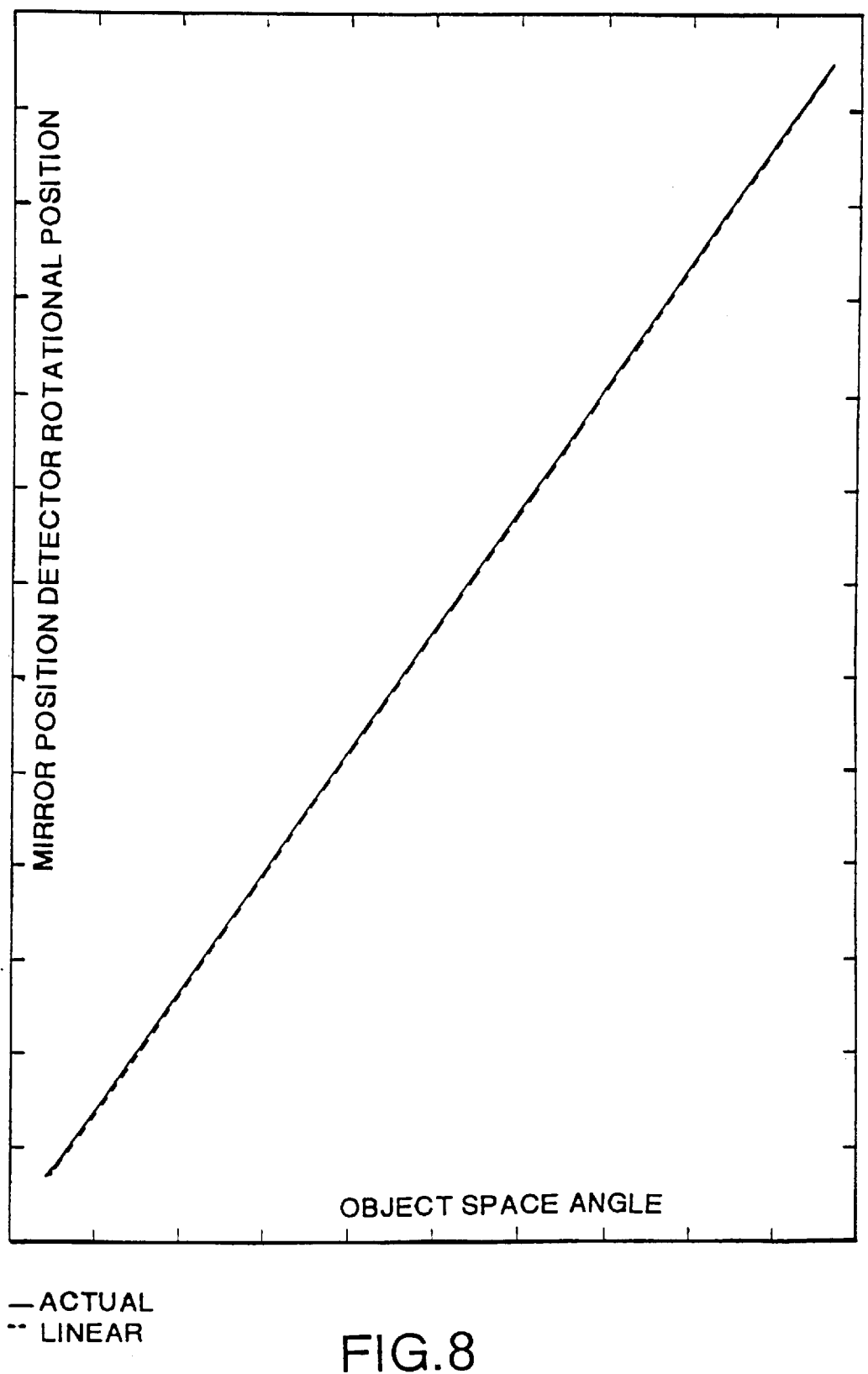
FIG. 8 illustrates an improvement in non-linearity over both FIGS. 6 and 7 when the rotational position of the mirror position detector is used to represent the object space angle.

In contrast, FIG. 8 illustrates, with a solid line, a graph of the rotational position of the mirror position detector with respect to the object space angle δ, if the mirror position detector were mounted by the method of the present invention outlined on the flowchart of FIG. 2 and illustrated in FIG. 1. A linear relationship between the rotational position indicated by the mirror position detector and the object space angle δ is illustrated by the dotted line. As can readily be seen by comparison between the dotted line and the solid line, a substantially linear relationship is indicated over the entire scanning sector. Thus, the method of the present invention indeed linearizes (typically to within 1%) the rotational position of the mirror position detector with respect to the object space angle.

Description of Convergent Beam Scanned Imaging System

Referring again to FIG. 1, illustrated is a typical implementation of an imaging system 10 incorporating convergent beam scanning in which the method of the present invention may be used to reduce inherent distortion. By placing the converging lens imager 12 ahead of the scanner mirror 14, the scanner mirror 14 sees a reduced field of view or optical bundle and can thus be made quite small. This also permits the detector 20 to be mounted relatively near the scanner mirror 14 as shown. In contrast, parallel beam scanning techniques require that a window be used which is substantially larger than the imager 12 illustrated. As a consequence of the larger imager in parallel beam scanning the scanner mirror must also be enlarged in order to accept the complete parallel optical bundle. In addition, focusing optics must be added between the scanner mirror and the detector. Such requirements result in a larger and heavier package that is unsuitable for many applications such as sights for man-portable weapons.

In the imaging system 10 of FIG. 1, an external image passes through the imager 12 and is reflected by the scanner mirror 14 onto the detector 20, which consists of a plurality of miniature sensors in a vertical array. The detector 20 could be embodied as any linear array. In the subject imaging system it is embodied as a staggered linear array of 160 elements consisting of 2 columns of 80 detectors. Each detector element is one mil in horizontal dimension and 1.33 mils in vertical dimension spaced on two mil vertical centers. The two columns are separated by 2.5 mils horizontally and offset by one mil vertically. The height of the vertical array of sensors in the detector 20 provides the vertical dimension of the image to be scanned. The scanner mirror 14 is rotated by the scanner mirror motor 18, which functions to horizontally sweep the scanning sector or field of view across the vertical array. The horizontal sweep provides a horizontal dimension of the scanning sector in the form of a sequence of snapshots or vertical frames that differ in time and, therefore, object space angle δ. The mirror position detector 16 is incorporated to provide a substantially linear representation of the instantaneous object space angle δ to the signal processor 22.

The substantially linear representation of the object space angle δ enables the signal processor 22 to store digital information representative of each sample or vertical line in the appropriate location in digital memory (not shown) according to the corresponding object space angle δ. The digital memory is then read at a rate substantially greater than the rate used to write the frame information in order to provide a constant stream of video signals to the viewfinder for analysis by a human viewer 52. Thus, the substantially linear representation of the object space angle δ must be known in order to collect, process and display the scanning sector properly.

The mirror position detector 16 can be realized by a commercially available optical pulse counting type of pick-off detector such as the three channel optical incremental encoder module HEDS-9040 (part numbers HEDS-9040 and HEDS-9041, the data sheet for which is hereby incorporated by reference) manufactured by Hewlett Packard. These particular devices are relatively inexpensive and are used to detect rotary position when used in conjunction with codewheels or reticles 40 as shown in FIG. 1. Each of these devices comprises a lensed LED source and a detector integrated circuit enclosed within a small plastic package. The reticle 40 is shown in FIG. 1 as a semicircular structure or a portion of a semicircle comprising gratings that are monitored by the mirror position detector 16 and result in pulses being output from the mirror position detector 16 to the signal processor 22 by means well known in the art. Since the mirror position detector 16 is substantially fixed in space and the reticle 40 is substantially fixed to the scanner mirror 14, the pulses indicate the rotational position of the scanner mirror 14.

In addition to being rotated, the scanner mirror is also subject to a reciprocating motion or "pullback" which provides for continuous focus correction out to the outer fringes of the scanning sector required in order to obtain continuous focus. In order to accomplish this pullback the scanner mirror 14 is additionally comprised of a scanner pin 26, a slot 28, and a intermediate linkage 30 which is rotatably attached to a crank 32 via a linkage pin 34. The crank 32 is rotatably attached to the scanner mirror motor 18 by a motor shaft 38. As the scanner mirror motor 18 rotates in the directions shown by arrow A1, the rotation is transferred to the crank 32 via the motor shaft 38. The mirror pin 26, the motor shaft 38 and the mirror position detector are each substantially fixed with respect to each other and do not reflect any substantial movement during the rotation and pullback of the scanner mirror 14 (other than perhaps rotational movement which does not displace them with respect to each other). The slot 28 is designed to provide a relatively tight fit for the mirror pin 26 to prevent it from moving from side to side while simultaneously permitting the mirror pin 26 to slide freely along its length.

Since the mirror pin 26 is fixed and the crank 32 is rotatably attached to the intermediate linkage 30 via the linkage pin 34, the rotation of the crank 32 is translated to a rotation of the scanner mirror 14 about the mirror pin 26 in addition to translation of the mirror pin about the length of the slot 28. This translation along the length of the slot 28 results in the surface of the scanner mirror 14 being pulled back as the crank 32 reaches the end of its travel or scanning sector in either direction of rotation as shown by arrow A1. Thus, when the scanner mirror 14 is in a 45 degree position with respect to a central ray 36 as shown in FIG. 1, the scanner mirror 14 occupies a forward (i.e. non-pulled back) position as shown by the fact that the mirror pin 26 is located at the rear end of the slot 28 (keeping in mind that the slot 28 is part of the scanner mirror 14 and the mirror pin 26 is substantially fixed with respect to the imaging system 10). However, as the scanner mirror 14 is rotated either clockwise or counter-clockwise about the mirror pin, the scanner mirror 14 is pulled back from its forward position, which it occupies in the 45-degree position, as the mirror pin 26 is forced to slide within the slot 28 due to the constraints of the crank 32 and the intermediate linkage 30. Thus, the reflective surface of the scanner mirror 14 approximately follows an ideal locus of tangents such as the ellipse 68 illustrated in FIG. 5.

Effect of Location of Mirror Position Detector on Linearity

The pullback phenomenon described above is utilized as a basis for correcting the inherent distortion in convergent beam scanned imaging systems of the present invention. The present invention corrects inherent distortion in convergent beam scanned imaging systems by utilizing a component of pullback to correct the non-linearity associated with merely using the rotational position of the scanner mirror 14 or the scanner mirror motor 18 to represent the object space angle δ required by the detector 20. The distortion manifests itself in unequal mirror rotation angles when scanning equal spacial angles. In the example illustrated in FIGS. 9A–F the reticule 40 is rotated by twenty degrees in the counter-clockwise direction and thirty degrees in the clockwise direction.

Figure 9D:
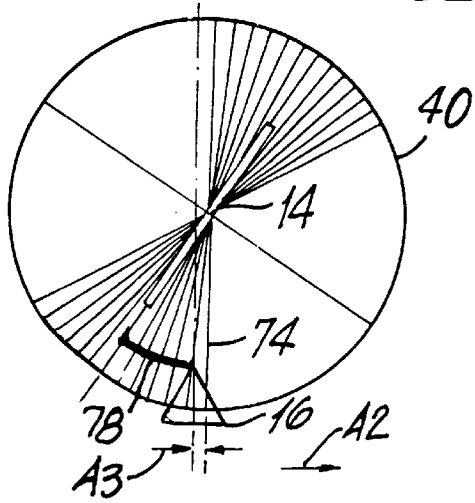
FIGS. 9A–F illustrate the impact of placement of the mirror position detector with respect to the direction of pullback on output from the mirror position detector.
Figure 9A:
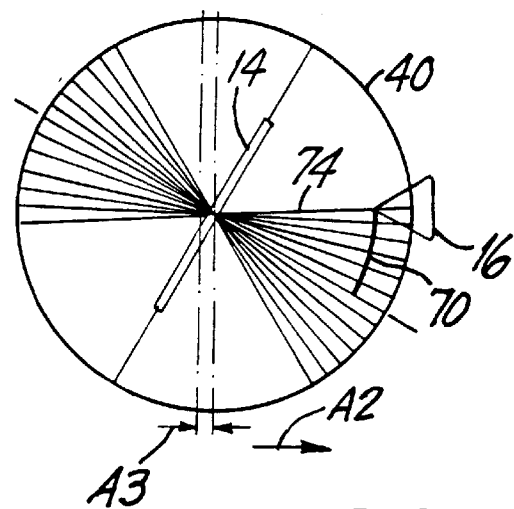
Figure 9E:
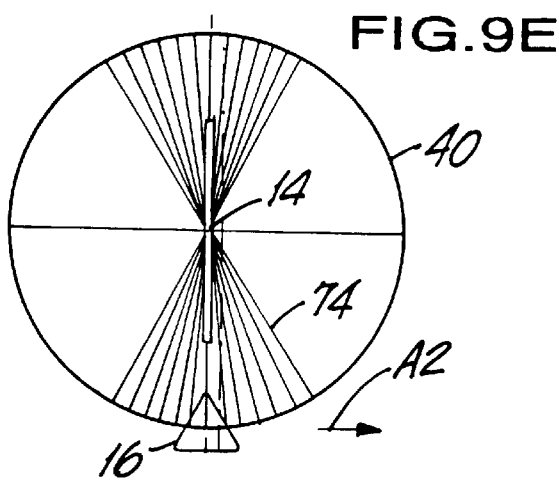
Figure 9B:
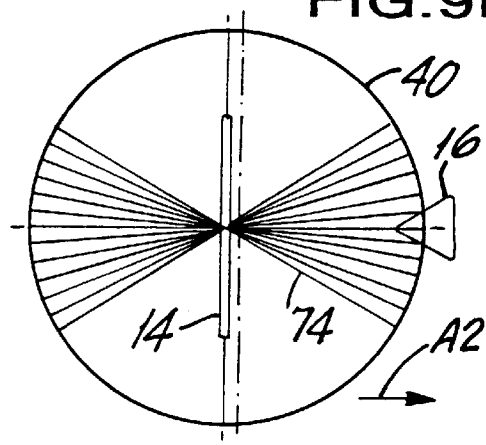
Figure 9F:
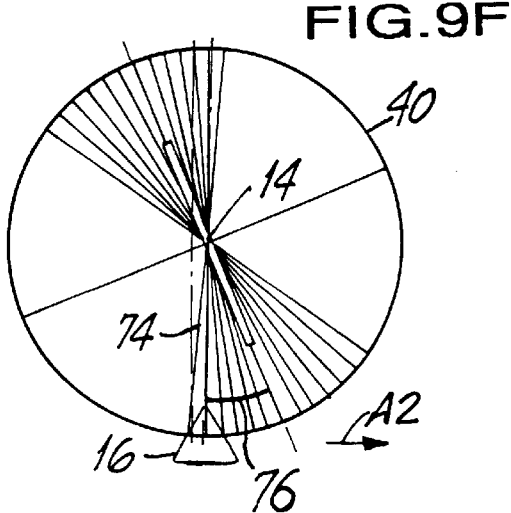
Figure 9C:
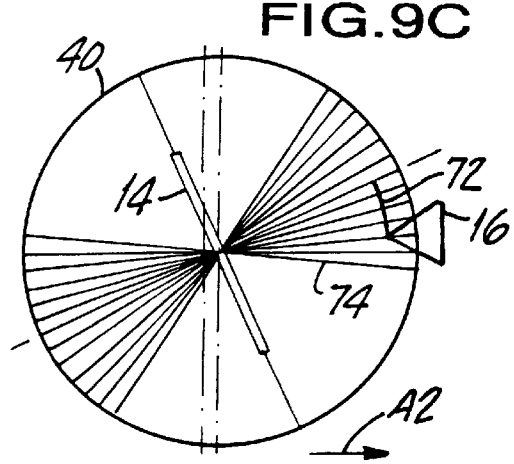

The mirror position detector 16 shown in FIGS. 9A–F is a simplified pulse counter type of position encoder. For purposes of illustration, each of the gratings 74 in the reticle 40 represents five degrees of rotation. When placed in line with the direction of pullback (as shown by arrow A2) the mirror position detector 16 will count rotational pulses as indicated by scanning arcs 70 and 72 in FIGS. 9A and 9C. In FIGS. 9A–C the direction of pullback as indicated by arrow A2 is in-line with the mirror position detector 16. In FIG. 9A, as the reticle 40 is rotated thirty degrees in a clockwise direction from a starting position illustrated in FIG. 9B, the mirror position detector 16 counts the passing of six gratings 74 as indicated by the scanning arc 70.

Likewise, in FIG. 9C, as the reticle 40 is rotated twenty degrees in a counter-clockwise direction from the starting position illustrated in FIG. 9B, the mirror position detector 16 counts the passing of 4 gratings 74 as indicated by scanning arc 72. It must be noted that pullback in the direction indicated by arrow A2 by an amount indicated with arrows A3 was performed on the reticle 40 in both FIGS. 9A and 9C from the starting position of FIG. 9B. Therefore, when the direction of pullback is in-line with the location of the mirror position detector 16 the scanning arc is directly proportional to the amount of rotation of the reticle 40. In other words, when the direction of pullback is in-line with the location of the mirror position detector 16 the pullback has no effect on the output of the mirror position detector 16, and unequal counts will be read.

The present invention seeks to correct the nonlinearity by moving the mirror position detector from the pullback in-line position, illustrated in FIGS. 9A–C, to a new position where pullback will affect the output of the mirror position detector 16 as shown in FIGS. 9D–F. In FIG. 9F, the mirror scanner 14 is illustrated pulled back in the direction of pullback (shown by arrow A2) and rotated twenty degrees counter-clockwise from the no pullback reference position shown in FIG. 9E. It is readily seen that rotation in the counter-clockwise direction by twenty degrees, which would normally pass four gratings 74 without the effect of pullback (as illustrated in FIG. 9C), now passes five gratings 74 as with the effect of pullback as shown by scanning arc 76. The additional grating 74 passed is a result of the effect of positive pullback wherein a component of the direction of pullback is in the direction of rotation.

Likewise, in FIG. 9D, the mirror scanner 14 is illustrated pulled back in the direction of pullback (as indicated by arrow A) and rotated thirty degrees clockwise from the no pullback reference position shown in Fig. E. It is readily seen that rotation in the clockwise direction by thirty degrees, which would normally pass six gratings 74 without the effect of pullback (as illustrated in FIG. 9A), now passes only five gratings 74 with the effect of pullback as shown by scanning arc 78. The reduction in gratings 74 passed is a result of the effect of subtractive pullback wherein a component of the direction of pullback opposes the direction of rotation.

Notice that in FIG. 9D and 9F, although the scanning angles are quite different, the number of gratings 74 passed are equal. This is accomplished by incorporating additive and subtractive pullback in the output from the mirror position detector 14. Although FIGS. 9D–F illustrate the effect of moving the mirror position detector 16 such that it is perpendicular to the direction of pullback, the exact rotational position of the mirror position detector 16 along the reticle 40 depends on the physical characteristics of the imaging system as illustrated in FIG. 3.

Thus the precise effect pullback has on the number of gratings 74 passed is a function of the position of the mirror position detector 16 along the reticle 40. When it is positioned in the direction of or in-line with pullback (as in FIGS. 9A–C) pullback has virtually no effect on the number of gratings 74 passed. When, however, the mirror position detector 16 is positioned perpendicular to the direction of pullback (as in FIGS. 9D–F) pullback has the maximum effect. In this position, pullback adds to the number of gratings 74 passed if the direction of rotation is the same as a component of the direction of pullback, and subtracts from the number of gratings 74 passed if the direction of rotation opposes that of a component of pullback. The examples discussed above represent the minimum and maximum effects of pickoff position. An intermediate pickoff position must be calculated as a function of several scan parameters.

Method for Determining Location of Mirror Position Detector

As stated above the substantially linear representation of the object space angle δ must be made available to the signal processor 22 in order to correctly store and process successive frames by the signal processor 22 (each corresponding to different object space angles δ) obtained from the detector 20. It was found that by using an iterative process that the mirror position detector 16 could be located in an optimal position along the circumference of the reticle 40 such that the output of the mirror position detector 16 would be substantially linear with respect to the object space angle δ. This method essentially uses a component of the pullback to correct the output of the mirror position detector 16 such that its output is substantially linear to the current object space angle δ. As a byproduct of this linearity, the period between pulses from the mirror position detector 16 is uniform. Uniformly spaced pulses are required if the multiplexed processing and storage of samples or vertical lines from the detector 20 is to be performed at a constant rate. If the period between pulses from the mirror position detector 16 were not uniform, then offsets would be required which would complicate the implementation.

FIG. 2 illustrates an iterative mirror position detector linearization process, typically performed by a computer, that calculates the rotational position of the mirror position detector 14 along the reticle 40 for optimal linearization between the output of the mirror position detector 14 and the object space angle δ. The first step in the process defines system geometry 42 so that the computer can model the physical structure of the imaging system 10 mathematically. Physical constants such as crank r1 and intermediate linkage r2 dimensions; focal lengths; and coordinates of the mirror position detector 16, detector 20, scanner mirror 14, and scanner mirror motor 18 are initialized. FIG. 3 illustrates the relevant angular variables and essential components of the convergent beam scanned imaging system 10 referenced to x and y axes comprising the crank (represented by r2 in FIG. 3), the intermediate linkage (represented by r1 in FIG. 3), the slot 28, the mirror pin 26, the scanner mirror 14, the mirror position detector 16 and the detector 20. Upon definition of system geometry the position of the mirror position detector is either initialized in the first iteration of the process or modified in subsequent iterations in step 44. The scanner mirror motor 18 located at (0,0) is initialized during the first iteration of the process and incrementally rotated through a motor angle Θ on subsequent iterations of the process in step 46, which operates to both rotate and pullback or push forward the scanner mirror 14.

The position of the scanner mirror 14 as a result of the rotation of the scanner mirror motor 18 in step 46 is then calculated in step 48 and the position of the reflected or reflected detector is calculated in step 50. The position of the reflected detector is used to calculate the object space angle δ, which is then calculated in step 54. At this point the process must determine in step 60 whether the scanning sector has been completed. If the scanning sector is incomplete then another iteration of the process will be initiated by proceeding to step 46 and rotating the scanner mirror motor 18 to a subsequent predetermined incremental position in the scanning sector. However, if the scanning sector is complete then the process will proceed to step 62 where the normalized slope of the object space angle δ with respect to the encoder angle is calculated. This slope yields the relative degree of linearity of the mirror position detector angle η with respect to the object space angle δ and if the relative linearity is not within the desired range, then another iteration of the process is performed by returning to step 44 and modifying mirror position detector angle η. The direction in which to increment the mirror position detector 16 along the reticle is indicated by the sign of the normalized slope calculated in step 62 via mathematical analysis well known in the art of empirical methods such as a binary search.

If the desired linearity has been achieved, then the location of the mirror position detector 16 used during the last iteration of the process is rendered as the optimal solution over the scanning sector. The process outlined above can readily be performed using a program such as Mathcad®, as provided in FIGS. 4A–G utilizing the variables shown in FIG. 3. Distortion results are tabulated for various positions of the mirror position detector 16. For instance, by initializing the mirror position detector angle η to one degree (corresponding to 45−1=44 degrees to the scanner mirror 14) and inserting it into the equations, the resultant angles, pullback distance, and nonlinearities may be calculated. A tabulation of the results of these calculations reveals nonlinearity to be less than 1% over the scanner motion as illustrated graphically in FIG. 8.

The major advantage of the present invention is that it allows use of commercially available low cost position encoders and requires no additional parts. The present invention also makes convergent beam scanning more appealing, and a viable choice for many applications, as inherent distortion is no longer a factor even if the scanning sector is increased in magnitude.

Although the invention has been shown and described with respect to best mode embodiments thereof, it should be understood by those skilled in the art that the foregoing and various other changes, omissions and additions in the form and detail thereof may be made therein without departing from the spirit and scope of the present invention.

We claim:

1. An apparatus for position encoding in a convergent beam scanned imaging system, comprising:

gradation means affixed to a reflective surface for providing increments of position of said reflective surface, said reflective surface both rotating and substantially linearly translating in a reference plane that is substantially perpendicular to said reflective surface such that said reflective surface substantially follows a locus of tangents to an ellipse in said reference plane, said ellipse being substantially fixed in said reference plane, said gradation means moving substantially with said reflective surface in said reference plane; and position encoding means located at a position along said gradation means and substantially fixed in said reference plane for monitoring movement of said gradation means and, thereby monitoring said rotation and said substantially linear translation of said reflective surface, said position encoding means for outputting a signal indicative of said rotation and a portion of said substantially linear translation of said reflective surface, said position optimized such that said signal is substantially linear with respect to an object space angle.

2. The apparatus for position encoding in a convergent beam scanned imaging system of claim 1, wherein said optimized position of said position encoding means is determined by an iterative process.

3. The apparatus for position encoding in a convergent beam scanned imaging system of claim 2, wherein said iterative process is performed by a computer.

4. The apparatus for position encoding in a convergent beam scanned imaging system of claim 2, wherein said iterative process further comprises the steps of initializing said position of said position encoding means;

iteratively rotating and substantially linearly translating said reflective surface incrementally about a portion of said ellipse defined as a scanning sector while calculating said position of said position encoding means and said object space angle corresponding to said position at each of said increments, calculating linearity of said position with respect to said corresponding object space angle, and modifying said position of said position encoding means if a predetermined optimal linearity does not result from said calculation; and designating an optimal position of said position encoding means if said calculation results in said predetermined optimal linearity.

5. The apparatus for position encoding in a convergent beam scanned imaging system of claim 1, wherein said position encoding means further comprises an optical encoding means for detecting passage of gratings on said gradation means as said gradation means moves substantially with said reflective surface, said signal comprising pulses indicating a frequency of gratings which has passed said optical encoding means, thereby quantizing movement of said gradation means.

6. The apparatus for position encoding in a convergent beam scanned imaging system of claim 1, further comprising a crank affixed to a motor shaft at a first end of said crank, said crank rotated substantially in said reference plane about said motor shaft by a scanner mirror motor, said motor shaft substantially fixed in said reference plane;

a linkage rotatably attached to a second end of said crank by a linkage pin, said linkage substantially affixed to said reflective surface, said linkage comprising a slot, said slot comprising a front end and a rear end, said slot substantially perpendicular to said reflective surface in said reference plane; and a mirror pin substantially fixed in said reference plane and confined to substantially linearly translate between said front end and said rear end of said slot as said crank is rotated, thereby causing said reflective surface to both rotate and substantially linearly translate in said reference plane such that said reflective surface follows said locus of tangents to said ellipse as said mirror pin substantially linearly translates within said slot.

7. The apparatus for position encoding in a convergent beam scanned imaging system of claim 6, wherein said mirror pin substantially linearly translates away from said reflective surface as said reflective surface rotates away from a central position wherein said reflective surface is substantially 45 degrees with respect to a central ray normal to a surface of a lens, thereby permitting said reflective surface to pullback from said lens as said reflective surface is rotated away from said central position permitting said reflective surface to follow said locus of tangents to said ellipse.

8. An apparatus for position encoding in a convergent beam scanned imaging system, comprising:

a reticle affixed to a scanner mirror, said scanner mirror comprising a reflective surface, said scanner mirror both rotating and substantially linearly translating in a reference plane that is substantially perpendicular to said reflective surface such that said reflective surface substantially follows a locus of tangents to an ellipse in said reference plane, said ellipse being substantially fixed in said reference plane, said reticle being substantially semicircular in said reference plane and rotating substantially with said scanner mirror; and an encoder located at an angular position along said reticle and substantially fixed in said reference plane, said encoder monitoring rotation of said reticle and, thereby monitoring said rotation and said substantially linear translation of said scanner mirror, said encoder outputting a signal indicative of said rotation and a portion of said substantially linear translation of said scanner mirror, said angular position optimized such that said signal is substantially linear with respect to an object space angle.

9. The apparatus for position encoding in a convergent beam scanned imaging system of claim 8, wherein said optimized angular position is determined by an iterative process.

10. The apparatus for position encoding in a convergent beam scanned imaging system of claim 9, wherein said iterative process is performed by a computer.

11. The apparatus for position encoding in a convergent beam scanned imaging system of claim 9, wherein said iterative process further comprises the steps of initializing said angular position of said encoder;

iteratively rotating and substantially linearly translating said scanner mirror incrementally about a portion of said ellipse defined as a scanning sector while calculating said angular position of said encoder and said object space angle corresponding to said angular position at each of said increments, calculating linearity of said angular position with respect to said corresponding object space angle, and modifying said angular position of said encoder if a predetermined optimal linearity does not result from said calculation; and designating an optimal angular position of said encoder if said calculation results in said predetermined optimal linearity.

12. The apparatus for position encoding in a convergent beam scanned imaging system of claim 8, wherein said encoder further comprises an optical encoder that detects passing of gratings on said reticle as said reticle rotates substantially with said scanner mirror, said signal comprising pulses indicating a frequency of gratings which has passed said optical encoder, thereby quantizing rotation of said reticle.

13. The apparatus for position encoding in a convergent beam scanned imaging system of claim 8, further comprising a crank affixed to a motor shaft at a first end of said crank, said crank rotated substantially in said reference plane about said motor shaft by a scanner mirror motor, said motor shaft substantially fixed in said reference plane;

a linkage rotatably attached to a second end of said crank by a linkage pin, said linkage substantially affixed to said scanner mirror, said linkage comprising a slot, said slot comprising a front end and a rear end, said slot substantially perpendicular to said reflective surface in said reference plane; and a mirror pin substantially fixed in said reference plane and confined to substantially linearly translate between said front end and said rear end of said slot as said crank is rotated, thereby causing said scanner mirror to both rotate and substantially linearly translate in said reference plane such that said reflective surface follows said locus of tangents to said ellipse as said mirror pin substantially linearly translates within said slot.

14. The apparatus for position encoding in a convergent beam scanned imaging system of claim 13, wherein said mirror pin substantially linearly translates away from said scanner mirror as said scanner mirror rotates away from a central position wherein said reflective surface is substantially 45 degrees with respect to a central ray normal to a surface of a lens, thereby permitting said scanner mirror to pullback from said lens as said scanner mirror is rotated away from said central position permitting said reflective surface to follow said locus of tangents to said ellipse.

15. A convergent beam scanned imaging system, comprising:

imaging means for passing an external image;

a scanner mirror comprising a reflective surface, said scanner mirror both rotating and substantially linearly translating in a reference plane that is substantially perpendicular to said reflective surface such that said reflective surface substantially follows a locus of tangents to an ellipse in said reference plane, said ellipse being substantially fixed in said reference plane, said external image reflecting from said scanner mirror as a reflected image;

a reticle affixed to said scanner mirror, said reticle being substantially semicircular in said reference plane and rotating substantially with said scanner mirror;

encoding means located at an angular position along said reticle and substantially fixed in said reference plane for monitoring rotation of said reticle and, thereby monitoring said rotation and said substantially linear translation of said scanner mirror, said encoding means outputting a position signal indicative of said rotation and said substantially linear translation of said scanner mirror, said angular position optimized with an iterative process such that said position signal is substantially linear with respect to an object space angle;

detecting means comprising an array of sensors upon which said reflected signal from said scanner mirror impinges for outputting a detected signal representative of said reflected signal;

signal processing means for inputting said detected signal and said position signal and correlating said detected signal with said position signal, thereby associating said detected signal with said object space angle.

16. The convergent beam scanned imaging system of claim 15, wherein said iterative process further comprises the steps of initializing said angular position of said encoding means;

iteratively rotating and substantially linearly translating said scanner mirror incrementally about a portion of said ellipse defined as a scanning sector while calculating said angular position of said encoding means and said object space angle corresponding to said angular position at each of said increments, calculating linearity of said angular position with respect to said corresponding object space angle, and modifying said angular position of said encoding means if a predetermined optimal linearity does not result from said calculation; and designating an optimal angular position of said encoding means if said calculation results in said predetermined optimal linearity.

17. The convergent beam scanned imaging system of claim 15, wherein said encoding means further comprises an optical encoder that detects passing of gratings on said reticle as said reticle rotates substantially with said scanner mirror, said signal comprising pulses indicating a frequency of gratings which has passed said optical encoder, thereby quantizing rotation of said reticle.

18. The convergent beam scanned imaging system of claim 15, further comprising a crank affixed to a motor shaft at a first end of said crank, said crank rotated substantially in said reference plane about said motor shaft by a scanner mirror motor, said motor shaft substantially fixed in said reference plane;

a linkage rotatably attached to a second end of said crank by a linkage pin, said linkage substantially affixed to said scanner mirror, said linkage comprising a slot, said slot comprising a front end and a rear end, said slot substantially perpendicular to said reflective surface in said reference plane; and a mirror pin substantially fixed in said reference plane and confined to substantially linearly translate between said front end and said rear end of said slot as said crank is rotated, thereby causing said scanner mirror to both rotate and substantially linearly translate in said reference plane such that said reflective surface follows said locus of tangents to said ellipse as said mirror pin substantially linearly translates within said slot.

19. The convergent beam scanned imaging system of claim 18, wherein said mirror pin substantially linearly translates away from said scanner mirror as said scanner mirror rotates away from a central position wherein said reflective surface is substantially 45 degrees with respect to a central ray normal to a surface of a lens, thereby permitting said scanner mirror to pullback from said lens as said scanner mirror is rotated away from said central position permitting said reflective surface to follow said locus of tangents to said ellipse.

20. A method for position encoding in a convergent beam scanned imaging system, comprising:

grading a reflective surface which provides increments of rotation and translation of said reflective surface, rotating and substantially linearly translating said reflective surface in a reference plane that is substantially perpendicular to said reflective surface such that said reflective surface substantially follows a locus of tangents to an ellipse in said reference plane, said ellipse being substantially fixed in said reference plane;

mounting a position encoder which monitors and encodes said rotation and substantially linear translation of said reflective surface at a position about said reflective surface, said position being optimized with respect to linearization of said position signal with respect to an object space angle; and outputting said position signal.

21. The method for position encoding in a convergent beam scanned imaging system of claim 20, wherein said position is optimized by an iterative process.

22. The method for position encoding in a convergent beam scanned imaging system of claim 21, wherein said iterative process further comprises the steps of initializing said position of said position encoder;

iteratively rotating and substantially linearly translating said reflective surface incrementally about a portion of said ellipse defined as a scanning sector while calculating said position of said position encoder and said object space angle corresponding to said position at each of said increments, calculating linearity of said position with respect to said corresponding object space angles, and modifying said position of said position encoder if a predetermined optimal linearity does not result from said calculation; and designating an optimal position of said position encoder if said calculation results in said predetermined optimal linearity.

23. The method for position encoding in a convergent beam scanned imaging system of claim 20, wherein said rotating and substantially linearly translating said reflective surface further comprises translating substantially linearly said reflective surface away from a central position wherein said reflective surface is substantially 45 degrees with respect to a central ray normal to a surface of a lens, thereby permitting said reflective surface to pullback from said lens as said reflective surface is rotated away from said central position permitting said reflective surface to follow said locus of tangents to said ellipse.

\* \* \* \* \*